US012762844B2

(12) United States Patent
Khosla et al.

(10) Patent No.: US 12,762,844 B2
(45) Date of Patent: Oct. 13, 2026

(54) METHOD AND SYSTEM FOR GENERATING A DETECTOR FOR PROCESS MONITORING

(71) Applicant: The Boeing Company, Arlington, VA (US)

(72) Inventors: Deepak Khosla, Camarillo, CA (US); Brandon M. Courter, Torrance, CA (US); Shane E. Arthur, Kirkland, WA (US); Jeremy D. Howe, Everett, WA (US); Anders E. Heussy, Seattle, WA (US); Yang Chen, Westlake Village, CA (US)

(73) Assignee: The Boeing Company, Arlington, VA (US)

(*) Notice: Subject to any disclaimer, the term of this patent is extended or adjusted under 35 U.S.C. 154(b) by 296 days.

(21) Appl. No.: 18/430,997

(22) Filed: Feb. 2, 2024

(65) Prior Publication Data

US 2025/0252712 A1 Aug. 7, 2025

(51) Int. Cl.

| | |
|---|---|
| ***G06K 9/00*** | (2022.01) |
| ***G06V 10/25*** | (2022.01) |
| ***G06V 10/764*** | (2022.01) |
| ***G06V 10/774*** | (2022.01) |
| ***G06V 10/776*** | (2022.01) |
| ***G06V 20/70*** | (2022.01) |

(52) U.S. Cl.

CPC ............ *G06V 10/774* (2022.01); *G06V 10/25* (2022.01); *G06V 10/764* (2022.01); *G06V 10/776* (2022.01); *G06V 20/70* (2022.01)

(58) Field of Classification Search

CPC ...... G06V 10/774; G06V 10/25; G06V 20/70; G06V 10/776; G06V 10/764

See application file for complete search history.

(56) References Cited

U.S. PATENT DOCUMENTS 11,941,870 B1 * 3/2024 Kwon .................... G06V 20/58
2019/0325259 A1 10/2019 Murphy (Continued)

FOREIGN PATENT DOCUMENTS

CN 115880720 A 3/2023
WO 2020146133 A1 7/2020

OTHER PUBLICATIONS

European Patent Office, Extended European Search Report Issued in Application No. 25154339.3, Jun. 27, 2025, 6 pages.

(Continued)

*Primary Examiner* — Avinash Yentrapati
(74) *Attorney, Agent, or Firm* — Alleman Hall LLP

(57) ABSTRACT

A method of generating a detector includes obtaining a first training dataset having a first image sequence with a first set of object tags identifying at least one first object class in a corresponding image. A first set of ground truth tags is obtained based on a ground truth timeline identifying when the at least one first object class appeared in the first image sequence. Images from the first training dataset are discarded by either identifying object tags by class from the first set of object tags without a corresponding ground truth tag from the first set of ground truth tags or identifying object tags by class from the first set of ground truth tags without a corresponding object tag from the first set of object tags to generate a first verified training dataset. A first parts-level detector is trained based on the first verified training dataset.

20 Claims, 4 Drawing Sheets

(56) References Cited

U.S. PATENT DOCUMENTS

| | | | | |
|---|---|---|---|---|
| 2021/0150275 | A1 | 5/2021 | Schulter et al. | |
| 2022/0198703 | A1* | 6/2022 | Evans | G06T 3/40 |
| 2022/0212811 | A1* | 7/2022 | Khosla | G06V 10/46 |
| 2022/0306088 | A1 | 9/2022 | Rahimpour et al. | |
| 2023/0162488 | A1* | 5/2023 | Boulanger | G06V 10/774<br>382/157 |
| 2024/0420454 | A1* | 12/2024 | Chen | G06T 7/20 |
| 2024/0420471 | A1* | 12/2024 | Chen | G06T 7/20 |

OTHER PUBLICATIONS

United States Patent and Trademark Office, Office Action Issued in U.S. Appl. No. 18/333,967, Aug. 14, 2025, 21 pages.
European Patent Office, Extended European Search Report Issued in Application No. 24177405.8, Oct. 7, 2024, Germany, 5 pages.
"Principle 1. AI for Videos labeling," YouTube Website, Available Online at https://www.youtube.com/watch?v=7YUrXOseu-s&list=PLDo7qx2mEhsofZt0WgH968FuTM2bsnvUb&index=14, Feb. 2, 2023, 2 pages.

* cited by examiner

METHOD AND SYSTEM FOR GENERATING A DETECTOR FOR PROCESS MONITORING

FIELD

The present disclosure relates to a system and a method for generating a detector model, and in particular, to a detector model for process monitoring.

BACKGROUND

Machine learning is a process that analyzes to determine a model that maps input data to output data. One type of machine learning is supervised learning in which a model is trained with a dataset including known output data for a sufficient amount of input data. Once a model is trained, it may be deployed, i.e., applied to new input data to predict the expected output.

Machine learning may be applied to regression problems (where the output data are numeric, e.g., a voltage, a pressure, a number of cycles) and to classification problems (where the output data are labels, classes, and/or categories, e.g., pass-fail, failure type, etc.). For both types of problems, a broad array of machine learning algorithms is available, with new algorithms the subject of active research. However, it can be very labor intensive to generate the dataset to train the model. Also, the quality of the dataset provided for training can greatly influence the ability of the model to predict the expected output from a new dataset.

Therefore, there exists a need to improve input datasets used to train a model and the expected outputs it predicts.

DESCRIPTION OF THE DRAWINGS

Some embodiments of the present disclosure are now described, by way of example only, and with reference to the accompanying drawings. The same reference number represents the same element or the same type of element on all drawings.

SUMMARY

Figure 1:
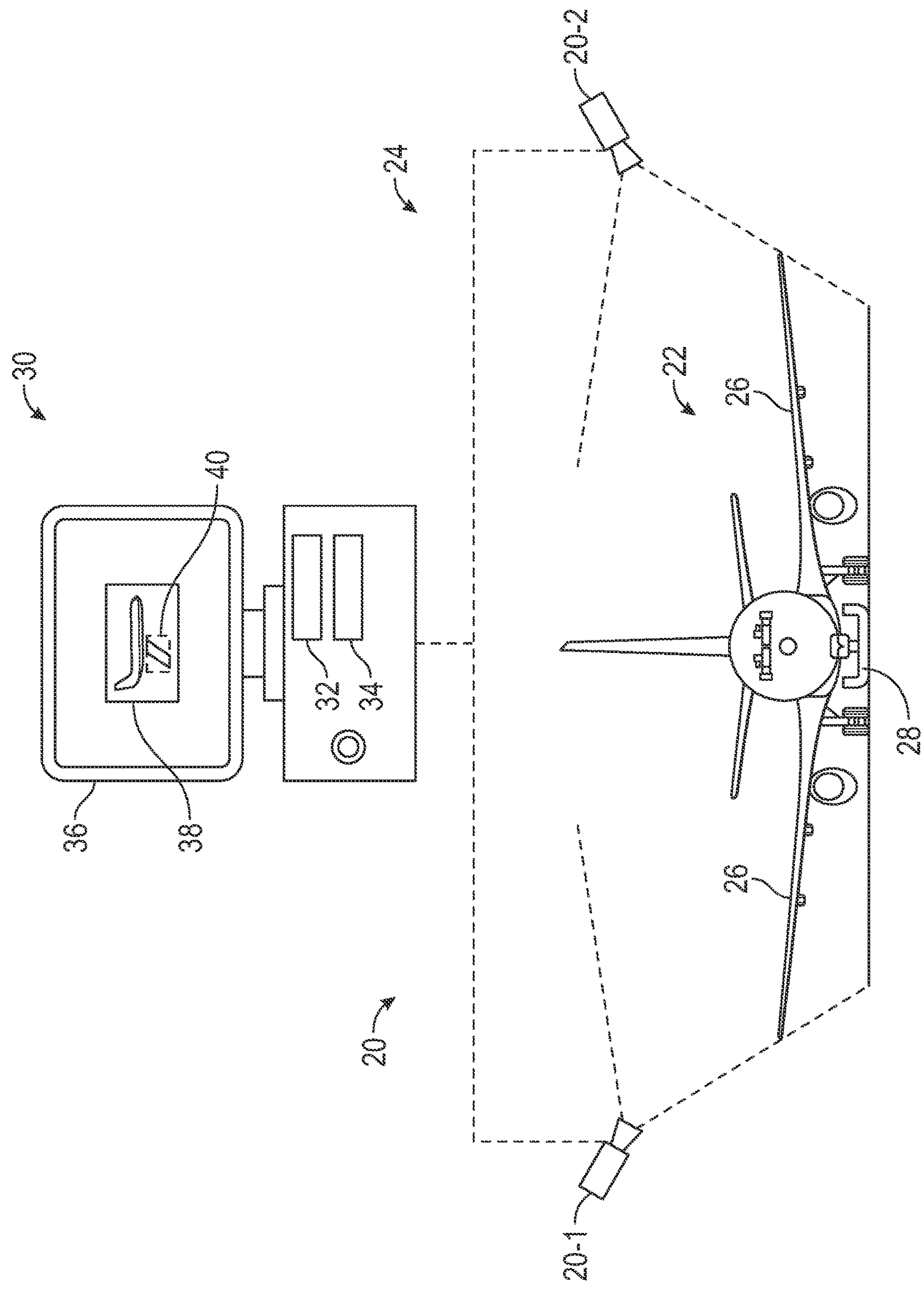
FIG. 1 illustrates an example camera system and computer system used in connection with an assembly process.

Disclosed herein is a method of generating a detector. The method includes obtaining a first training dataset having a first image sequence with a first set of object tags identifying at least one first object class in a corresponding image of the first image sequence. A first set of ground truth tags is obtained based on a ground truth timeline identifying when the at least one first object class appeared in the first image sequence. Images from the first training dataset are discarded by either identifying object tags by class from the first set of object tags without a corresponding ground truth tag from the first set of ground truth tags or identifying object tags by class from the first set of ground truth tags without a corresponding object tag from the first set of object tags to generate a first verified training dataset. A first parts-level detector is trained based on the first verified training dataset.

In one or more embodiments of the method, the at least one first object class includes a first object in a plurality of different configurations.

In one or more embodiments of the method, the first image sequence includes a second set of object tags identifying at least one second object class in a corresponding image of the first image sequence.

In one or more embodiments of the method, the first training dataset is created by receiving the first image sequence with the at least one first object class identified in at least one image of the first image sequence and tracking the at least one first object class identified in the at least one image through the first image sequence. A region of interest is tagged in each image of the first image sequence where the at least one first object class was tracked. The first training dataset is created by collecting the region of interest from each image in the first image sequence where the at least one first object class was tracked.

In one or more embodiments of the method, an additional parts-level detector is generated by obtaining an additional training dataset including an additional image sequence having an additional set of object tags identifying at least one additional object class in a corresponding image of the additional image sequence. An additional set of ground truth tags is obtained based on a ground truth timeline identifying when the at least one additional object class appeared in the additional image sequence. Images from the additional training dataset are discarded by identifying object tags by class from the additional set of object tags without a corresponding ground truth tag from the additional set of ground truth tags to generate an additional verified training dataset. An additional parts-level detector is trained based on the additional verified training dataset.

In one or more embodiments of the method, the additional training dataset is created by receiving the additional image sequence with the at least one additional object class identified in at least one image of the additional image sequence and tracking the at least one additional object class identified in the at least one image through the additional image sequence. A region of interest is tagged in each image of the additional image sequence where the at least one additional object class was tracked. The additional training dataset is created by collecting the region of interest from each image in the additional image sequence where the at least one additional object class was tracked.

In one or more embodiments of the method, the method includes training a unified detector utilizing the first parts-level detector on the additional verified training dataset and the additional parts-level detector on the first verified training dataset.

In one or more embodiments of the method, training the unified detector by utilizing the additional parts-level detector on the first verified training dataset includes tagging a region of interest corresponding to where the at least one additional object class appeared in each image of the first verified training dataset to create an updated additional training dataset.

In one or more embodiments of the method, the method includes discarding images from the updated additional training dataset by identifying object tags by class from the updated additional training dataset without a corresponding ground-truth tag from an updated set of ground truth tags.

In one or more embodiments of the method, training the unified detector by utilizing the first parts-level detector on the additional verified training dataset includes tagging a region of interest corresponding to where the at least one first object class appeared in each image of the additional verified training dataset to create an updated first training dataset.

In one or more embodiments of the method, the method includes discarding images from the updated first training dataset by identifying object tags by class from the updated first training dataset without a corresponding ground-truth tag from an updated set of ground truth tags.

Disclosed herein is a system for detecting objects. The system includes at least one camera configured to capture images and a controller. The controller is configured to obtain a first training dataset including a first image sequence having a first set of object tags identifying at least one first object class in a corresponding image of the first image sequence and obtain a first set of ground truth tags based on a ground truth timeline identifying when the at least one first object class appeared in the first image sequence. The controller is further configured to discard images from the first training dataset by either identifying object tags by class from the first set of object tags without a corresponding ground truth tag from the first set of ground truth tags or identifying object tags by class from the first set of ground truth tags without a corresponding object tag from the first set of object tags to generate a first verified training dataset. The controller is also configured to train a first parts-level detector based on the first verified training dataset.

In one or more embodiments of the system, the first training dataset is created by receiving the first image sequence with the at least one first object class identified in at least one image of the first image sequence and tracking the at least one first object class identified in the at least one image through the first image sequence. A region of interest is tagged in each image of the first image sequence where the at least one first object class was tracked. The first training dataset is created by collecting the region of interest from each image in the first image sequence where the at least one first object class was tracked.

In one or more embodiments of the system, the controller is further configured to obtain an additional training dataset including an additional image sequence having an additional set of object tags identifying at least one additional object class in a corresponding image of the additional image sequence and obtain an additional set of ground truth tags based on a ground truth timeline identifying when the at least one additional object class appeared in the additional image sequence. The controller is also configured to discard images from the additional training dataset by identifying object tags by class from the additional set of object tags without a corresponding ground truth tag from the additional set of ground truth tags to generate an additional verified training dataset and train an additional parts-level detector based on the additional verified training dataset.

In one or more embodiments of the system, the controller is configured to train a unified detector utilizing the first parts-level detector on the additional verified training dataset and the additional parts-level detector on the first verified training dataset.

In one or more embodiments of the system the controller is configured to train the unified detector by utilizing the additional parts-level detector on the first verified training dataset includes tagging a region of interest corresponding to where the at least one additional object class appeared in each image of the first verified training dataset to create an updated additional training dataset. The controller is also configured to train the unified detector by utilizing the first parts-level detector on the additional verified training dataset includes tagging a region of interest corresponding to where the at least one first object class appeared in each image of the additional verified training dataset to create an updated first training dataset.

Disclosed herein is a non-transitory computer readable medium embodying programmed instructions which, when executed by a processor, are operable for performing a method.

The method includes obtaining a first training dataset having a first image sequence with a first set of object tags identifying at least one first object class in a corresponding image of the first image sequence. A first set of ground truth tags is obtained based on a ground truth timeline identifying when the at least one first object class appeared in the first image sequence. Images from the first training dataset are discarded by either identifying object tags by class from the first set of object tags without a corresponding ground truth tag from the first set of ground truth tags or identifying object tags by class from the first set of ground truth tags without a corresponding object tag from the first set of object tags to generate a first verified training dataset. A first parts-level detector is trained based on the first verified training dataset.

In one or more embodiments of the computer readable medium, the method includes generating an additional parts-level detector by obtaining an additional training dataset including an additional image sequence having an additional set of object tags identifying at least one additional object class in a corresponding image of the additional image sequence. An additional set of ground truth tags is obtained based on a ground truth timeline identifying when the at least one additional object class appeared in the additional image sequence. Images from the additional training dataset are discarded by identifying object tags by class from the additional set of object tags without a corresponding ground truth tag from the additional set of ground truth tags to generate an additional verified training dataset. An additional parts-level detector is trained based on the additional verified training dataset.

In one or more embodiments of the computer readable medium, the method includes training a unified detector utilizing the first parts-level detector on the additional verified training dataset and the additional parts-level detector on the first verified training dataset.

In one or more embodiments of the computer readable medium, training the unified detector by utilizing the additional parts-level detector on the first verified training dataset includes tagging a region of interest corresponding to where the at least one additional object class appeared in each image of the first verified training dataset to create an updated additional training dataset. Furthermore, training the unified detector by utilizing the first parts-level detector on the additional verified training dataset includes tagging a region of interest corresponding to where the at least one first object class appeared in each image of the additional verified training dataset to create an updated first training dataset.

The above summary is not intended to represent every possible embodiment or every aspect of the present disclosure. Rather, the foregoing summary is intended to exemplify some of the novel aspects and features disclosed herein. The features, functions, and advantages of the present disclosure can be achieved independently in various embodiments or may be combined in other embodiments, further details of which may be seen with reference to the following detailed description and accompanying drawings.

DESCRIPTION

The Figures and the following description illustrate specific exemplary embodiments of the disclosure. A person of ordinary skill in the art will be able to devise various arrangements that, although not explicitly described or shown herein, embody the principles of the disclosure and are included within the scope of the disclosure. Furthermore, any examples described herein are intended to aid in understanding the principles of the disclosure and are to be construed as being without limitation to such specifically recited examples and conditions. As a result, the disclosure is not limited to the specific embodiments or examples described below, but by the claims and their equivalents.

FIG. 1 illustrates an example camera system 20 having a first camera 20-1 and a second camera 20-2 for monitoring an assembly process, such as an assembly of an aircraft 22 on an assembly line. The camera system 20 is in communication with a computer system 30 that receives images from the camera system 20. Although the illustrated example of the camera system 20 and computer system 30 is shown in relation to an assembly process, this disclosure applies to other areas where it is desirable to perform object detection.

While the computer system 30 of FIG. 1 is depicted as a unitary computer module for illustrative simplicity, the computer system 30 can be physically embodied as one or more processing nodes having a non-transitory computer-readable storage medium 34, i.e., application-sufficient memory, and associated hardware and software, such as but not limited to a high-speed clock, timer, input/output circuitry, buffer circuitry, and the like. The non-transitory computer-readable storage medium 34 may include enough read only memory, for instance magnetic or optical memory. Computer-readable code or instructions embodying the methods described below may be executed during operation of the computer system 30. To that end, the computer system 30 may encompass one or more processors 32, e.g., logic circuits, application-specific integrated circuits (ASICs), central processing units, microprocessors, and/or other requisite hardware as needed to provide the programmed functionality described herein. A display screen 36 may be connected to or in communication with the non-transitory computer readable storage medium 34 and processor(s) 32 to facilitate a graphical interface for a user implementing this disclosure as set forth below.

In the illustrated example, the cameras 20-1 and 20-2 are mounted above an aircraft assembly line 24 on opposite lateral sides of the aircraft 22 for the purpose of monitoring the process of assembling the aircraft 22. Depending on the process being monitored, the cameras 20-1 and 20-2 can capture images at a 4K resolution and up to thirty or more frames per second. Alternatively, the cameras 20-1, 20-2 can capture images at a lower resolution, such as 960×540, and at a rate of one image every 15 seconds. The variation in camera resolution and image capture rate depends on the size of the objects being detected and a length of time that the objects remain in a field of view of the cameras 20-1, 20-2. Also, collecting images at a lower resolution and rate reduces an amount of data that needs to be stored and handled by the computer system 30.

Also, this disclosure applies to camera systems 20 that use only a single camera or more than two cameras to capture images of a specific area. The number of cameras utilized for process monitoring depends on the required view needed to include the objects to be detected as some of the cameras may have an obstructed view of one or more objects.

Figure 2:
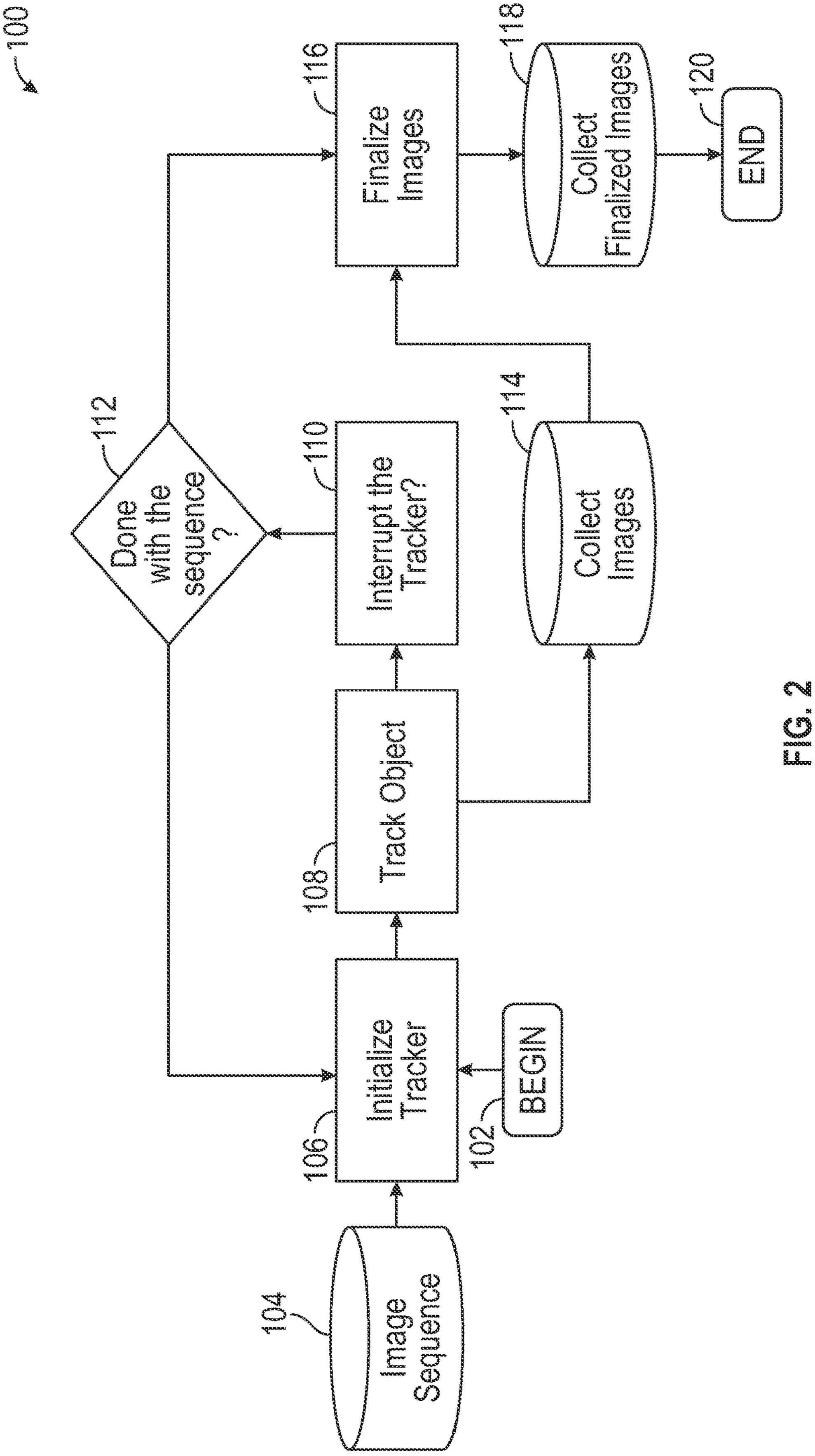
FIG. 2 illustrates an example method of generating a training dataset associated with an object or class of objects for a parts-level detector or first-level detector.

FIG. 2 illustrates an example method 100 of tagging images by tracking an image through a sequence of images. The method 100 can generate a training dataset associated with an object or class of objects for training a detection model for a detector, such as a parts-level detector. The method 100 is implemented for each desired object to be tracked from an image sequence that includes at least one image with the desired object. The method 100 is initiated at Block 102 and from Block 102 the method 100 receives an image sequence (Block 104) at Block 106. At Block 106, the desired object is highlighted in at least one of the images from the image sequence in Block 104. In one example, the image from the image sequence at or near a first appearance of the object in the sequence is utilized for highlighting the object. Alternatively, the image from the image sequence can be at or near the last appearance of the object.

The object can be highlighted by a user of the computer system 30. In one example, the object is highlighted by a user with a bounding box 40 that surrounds the object in the image 38 (See FIG. 1). The user can create the bounding box by placing a rectangle in the image 38 that surrounds the desired object. A location in the image and size of the rectangle are recorded or tagged with the image and used to track the object in the other images in the image sequence at Block 108.

When the object is tracked between the sequence of images at Block 108, a location of the bounding box in the specific image and a size of the rectangle identified by the user from Block 106 are used by a tracking algorithm to "track" or follow the object of interest through the image sequence. When the tracker is initiated at or near the last appearance of the object at Block 106, the object is tracked in reverse sequential order. For each image in the image sequence, the tracker will attempt to locate the same object of interest, and record information regarding the object of interest in the memory 34 of the computer system 30 associated with each image where the object was identified. The information tagged to each frame or image can include a location and size of the rectangle, a label identifying the object, such as a name or class of the object of interest, and a cropped image region of interest (ROI) with the object defined by the rectangle.

The object tracking process may be interrupted at Block 110 if the tracking algorithm has determined that the object of interest no longer exists in the image or is otherwise "lost" (e.g., this can be indicated by a confidence score below a set confidence threshold). Also, the user can intervene due to an error in the tracking results as judged by the user, e.g., when the tracker has locked on to an object other than the one the user initially selected.

At Block 112, the method 100 can return to Block 106 to modify the bounding box in the initial image identifying the object to improve the tracking of the object of interest again. Alternatively, when returning to Block 106, the user can select the image in the sequence where the object was lost by the tracking algorithm and highlight the correct object of interest in that image to allow the object to be tracked again in Block 108. The ability to restart the tracking algorithm at the place of failure and continue without having to reevaluate the same images from the image sequence again reduces time needed to evaluate the image sequence.

One feature of initializing the tracker from Block 106 at an initial appearance of the object in addition to a near end appearance of the object is that the object can be tracked on either side of an interruption that may occur at Block 110. For example, if an object is tracked from the initial appearance forward in time and from the near end appearance backwards in time, the tracking that occurs at Block 108 can be determined to be sufficient if a range of time between when the tracker was interrupted in the forward direction and when the tracker was interrupted in the backwards direction is within a predetermined length of time. Also, the tracker could stop if the time associated with an image when moving forward in time overlaps with an image when moving backwards in time.

At Block 114, the location and size of the rectangle, label identifying the object, and the cropped image region for each image in the image sequence are collected. The user can review the region of interest from each image in the sequence at Block 116 to confirm that the correct object of interest is identified in the region of interest as part of finalizing the collected images with associated information. If any of the regions of interest did not identify the correct object of interest, those regions of interest must be deleted from the finalized images.

In one example, the user finalizes images by viewing them on the display 36 of the computer system 30. Once the user has confirmed that the correct regions of interest have been identified in the images, the finalized images are collected at Block 118 and the method 100 proceeds to Block 120 and ends. The finalized images can be stored in the memory 34 of the computer system 30 or at another location, such as in the cloud. The finalized images form a training dataset for training a parts-level or first-level detector for the object or class of objects identified in the image sequence that will be verified as described below.

The method 100 can be repeated for the same or different image sequences showing another object of interest or configuration of the object to form another training dataset for that specific object or configuration that can be used for training the parts-level detector.

Since the user involvement is limited to initiating the tracking of the object of interest, the method 100 eliminates the need for the user to identify the object of interest from each image in the image sequence by utilizing image tracking throughout the image sequence. This reduces the time and labor needed to create or update the training dataset for the object.

Tracking of the object of interest performed at least in Blocks 106 and 108 can be accomplished by many different available tracking algorithms, such as simple trackers based on a cross-correlation coefficient. These trackers can be used in situations where the appearance and position of the object of interest remains relatively stable. However, other tracker algorithms can be used depending on the object being tracked.

One feature of this disclosure is a simplified tracking procedure for the object of interest by treating each object as a separate object to be tracked as it moves between different configurations or classes for that object. Therefore, if objects of interest are positioned in different "configurations," they are defined as different "objects" by a class that corresponds to that configuration for the object tracking that occurs in the method 100. For the example of objects associated with assembling the aircraft 22, aircraft wings 26 are presented in several different configurations, such as when they are first towed to the factory floor ("delivered"), when they are lifted by a crane and moved to the support stands on the sides of fuselage (known as "loaded"), and when they are mated to the fuselage ("attached"). Therefore, a single object, the wing 26 would create three different configurations or classes with corresponding images sequences that would be evaluated by the method 100 to create different training datasets for each configuration or class of the object.

Additionally, the method 100 may also track more than one object at a time at Block 108, such as a location of an access stand and a fuselage. One feature of being able to track multiple objects at a single time is to more accurately identify the occurrence of milestones in the assembly process by identifying the location or position of the objects relative to each other. For example, by tracking the location of the access stand relative to the fuselage, the disclosure can determine when the access stand is moved back as opposed to at the plane without the need for performing additional measurements.

In one example embodiment, at least one of the cameras 20-1, 20-2 captures an image of the assembly floor every 15 seconds. This reduces the burden of storing and processing large amounts of image data when the objects of interest are not moving quickly or frequently. In prior art approaches, tracking the movement of objects through discontinuous image frames was difficult to maintain at a high level of accuracy. However, this disclosure utilizes end states of where the objects of interest (in this example, the wings) are rather than how they are moved from one place to another during the assembly process. Therefore, having an object of interest in a "configuration" refers to the object in a particular state of assembly, e.g., "Wing LEFT Delivered", "Wing LEFT Loaded", etc.

Furthermore, an object of interest can be in different configuration even though its location has not changed. One example of such an object is a cradle 28 that supports a front end of the fuselage of the aircraft 22. During the assembly process, the cradle 28 will transition from a configuration of supporting the weight of the fuselage ("Cradle Support Plane") to one of not supporting the fuselage ("Cradle Not Supp Plane"), leaving the fuselage to be supported by the front nose gear. This is called "Downjack" and is an important milestone in the assembly process of most aircrafts 22 which can be identified by the detector model disclosed herein.

For object detection model training to occur, verified training datasets are created based on the results of training datasets from the method 100. The verified training datasets include images containing positive training samples of the object tagged with a label identifying the object at a location of the object, and a size of every object of interest to be detected in each of the images. Also, datasets of images without positive training samples are useful for the training object detection models as will be described in greater detail below.

The verified training datasets can be generated based on the training datasets from the method 100 discussed above and include "no object" training sets. The "no-object" training sets can include images of the same assembly factory floor before the object of interest is loaded to the workspace and before any components to be detected are present. This ensures that "no-object" training sets will not include false negatives.

Regarding the tagged images that are collected as part of the finalized images from Block 118, the tag-by-tracking process of the method 100 generates the training datasets for at least one object at a time for each (time-stamped) image in the image sequence that forms the training dataset. When the same image sequence is used to identify more than one object of interest, tags for different objects in the same image are merged into a single file for purposes of training the detection model as discussed below. Also, if the tagging process is not exhaustive (i.e., if the process fails to tag some objects in some of the images, or some of the tagging results were accidently deleted), the training dataset may inadvertently create negative training examples from positive images, i.e., a false negative identification. Likewise, the tagging process may also introduce false positives (failure to remove regions of interest that do not correspond to object of interest discussed above). That is, if the tag-by-tracking process of the method 100 fails to tag an object of interest in some images, a situation is created where the object exists but is not tagged, effectively making negative samples for training (i.e., telling the training algorithm for the detection model that the objects do not exist when in fact they do). Likewise, if the tag-by-tracking process created a tag that does not correspond to an object of interest, the effect to training is equally undesirable. Both false negative and false positive samples can cause harm to the training and reduce the performance of the resulting detection models.

Figure 3:
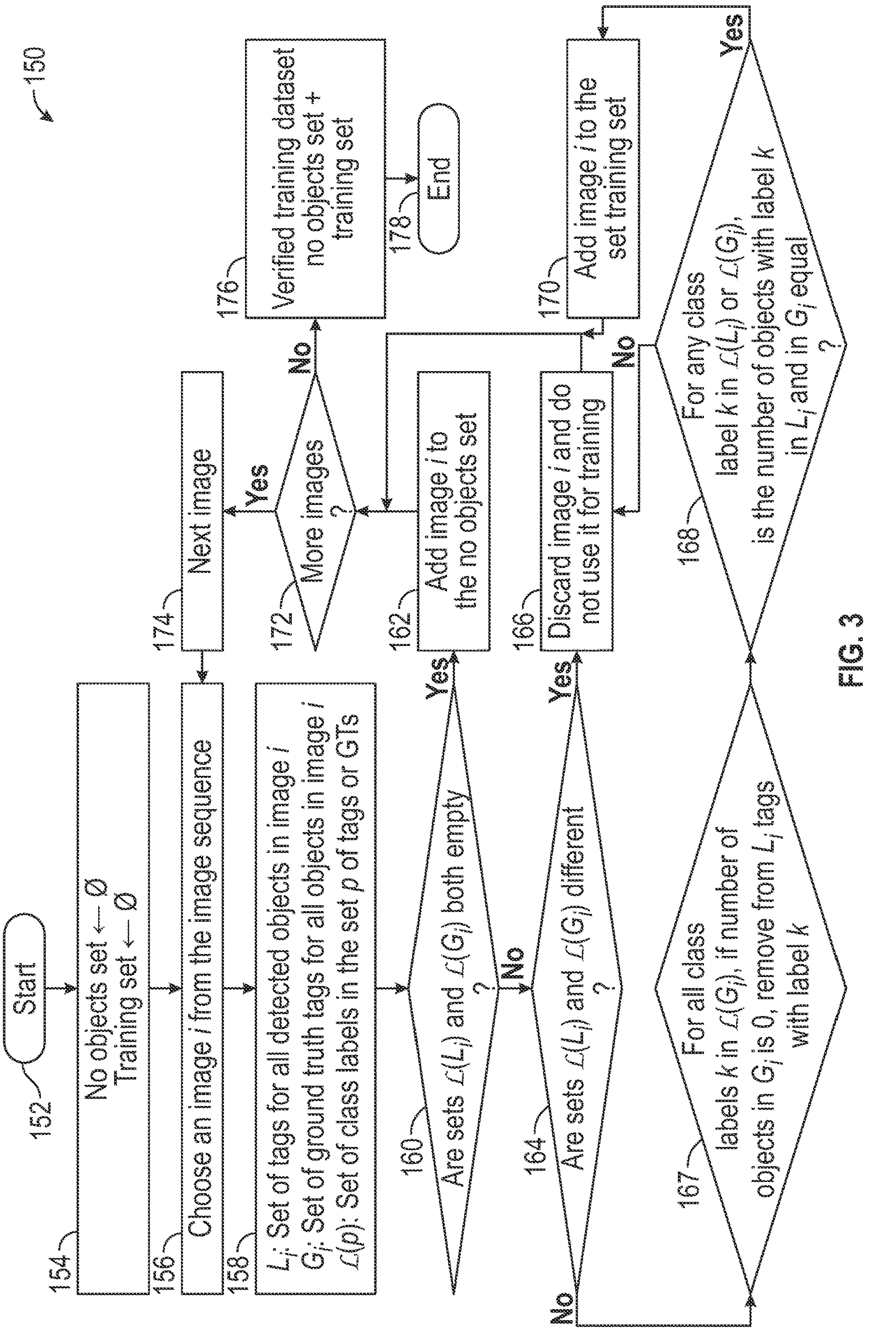
FIG. 3 illustrates an example method of generating a verified training dataset by performing a verification on the training dataset.
Figure 4:
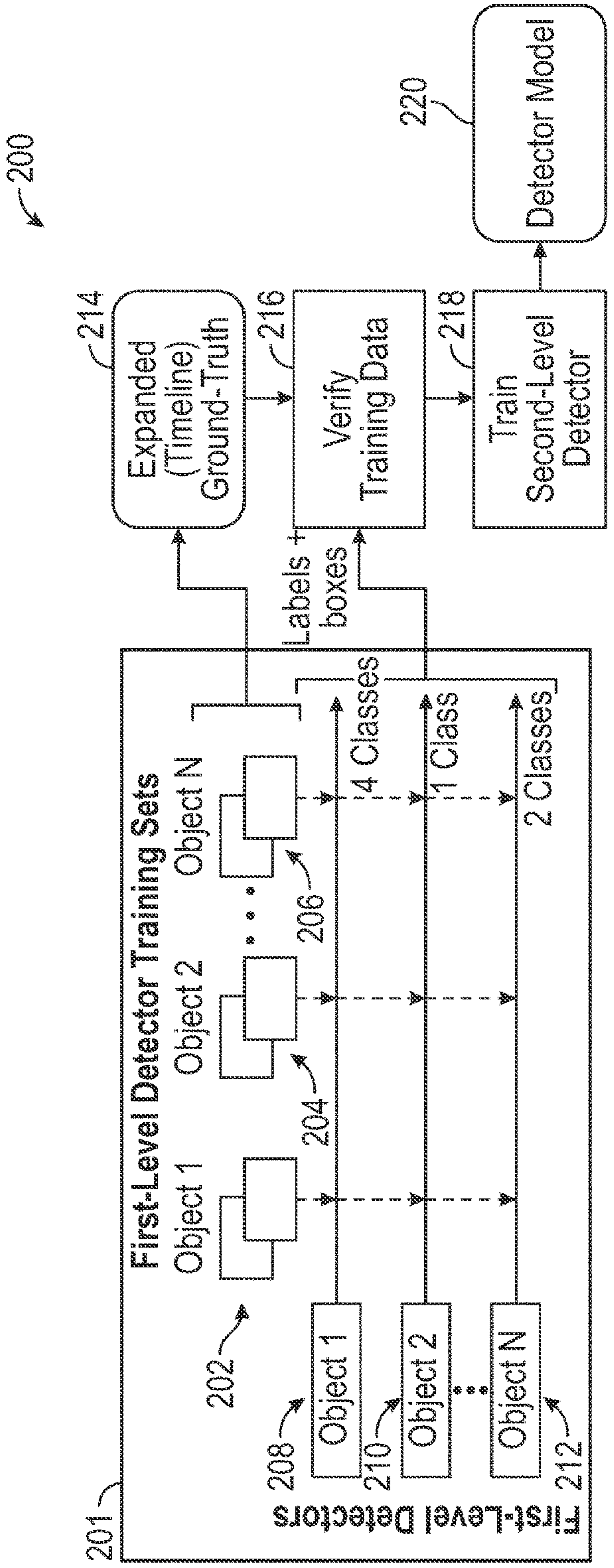
FIG. 4 illustrates an example method of training a unified detector.

To avoid inadvertently introducing false negative and false positive training examples, an automated verification process is created in which such false negative and false positive examples are eliminated. A method 150 of verifying the training datasets is illustrated in FIG. 3 to avoid creating such training examples.

The method 150 starts at Block 152 and proceeds to Block 154. Block 154 indicates the two types of datasets used to generate the verified training dataset at Block 176 are empty or null at this initial stage. The method 150 then proceeds to Block 156 to evaluate one of the finalized images as part of an image sequence from Block 118 with its associated information described above. The method 150 requires a ground-truth timeline file to be created by examining each image sequence and identifying and recording the times when each object or object class appeared and disappeared, or, broadly using the "generalized object detection" terminology, when a configuration becomes true for the related object and when the configuration is no longer true. This ground-truth timeline is stored in a "ground-truth" file. In the illustrated example, every image sequence in the training dataset will have a ground-truth file. The ground-truth timeline provides a verification process that eliminates false negatives and false positives from the verified training dataset. The ground-truth timeline also allows for the generation of "no objects" training sets as discussed above.

With the finalized images from Block 118 and the ground-truth timeline, the method 150 proceeds to Block 158 to begin verifying the accuracy of the tags for the chosen image from Block 156. As shown at Block 158, the method 150 identifies a set of tags ($L_i$) for all detected objects in the finalized image, a set of ground truth tags ($G_i$) for all objects in the image i, and a set of class labels ($\mathcal{L}(p)$) in a set p of tags or ground truths. The method then proceeds to Block 160 to evaluate the information.

At Block 160, the method 150 determines if set $\mathcal{L}(L_i)$ including all the detected objects in the image i and the set $\mathcal{L}(G_i)$ including the ground truth tags for all objects in the image i are both empty. If it is determined that the sets $\mathcal{L}(L_i)$ and $\mathcal{L}(G_i)$ are both empty, then the method 150 proceeds to Block 162 and adds the image i to a "no object" training set. The "no object" training set forms a portion of the verified training dataset at Block 176. If the sets $\mathcal{L}(L_i)$ and $\mathcal{L}(G_i)$ are not empty, the method proceeds to Block 164.

At Block 164, the method 150 determines if the sets $\mathcal{L}(L_i)$ and $\mathcal{L}(G_i)$ are different. For example, the method 150 will determine if there is difference between the objects detected in the sets $\mathcal{L}(L_i)$ and $\mathcal{L}(G_i)$. If the sets $\mathcal{L}(L_i)$ and $\mathcal{L}(G_i)$ are different, the method 150 proceeds to Block 166. At Block 166, the method 150 discards the image i for use in the verified training dataset at Block 176. The image i is discarded and not added to the verified training dataset because of the difference in number of objects detected from the set $\mathcal{L}(L_i)$ and the number that should have been detected based on the ground truth set $\mathcal{L}(G_i)$. If the method 150 determines that the sets $\mathcal{L}(L_i)$ and $\mathcal{L}(G_i)$ are not different or are matching, the method 150 proceeds to Block 167.

At Block 167, the method 150 is identifying false positive tags for the image i that do not exist in ground-truth. To identify such false positive tags, the method 150 looks for all class labels k in the set $\mathcal{L}(G_i)$ and removes from $L_i$ any tags with the label k (so that the number of tags with label k in $L_i$ becomes 0) if the number of objects with label k in $G_i$ is zero. Eliminating false positives is important when training the parts level detector and the unified detector. Once the method 150 has removed the false positives at Block 167, the method 100 proceeds to Block 168.

At Block 168, the method 150 evaluates class labels k between the sets $\mathcal{L}(L_i)$ or $\mathcal{L}(G_i)$. If the number of objects with the class label k is equal between the sets $\mathcal{L}(L_i)$ and $\mathcal{L}(G_i)$, the method 150 proceeds to Block 170 and adds the image i to the training set that forms a portion of the verified training dataset at Block 176. For example, the set $\mathcal{L}(G_i)$ will have a corresponding tag that identifies that the object and class identified from the set $\mathcal{L}(L_i)$ was present based on the ground-truth timeline when the set $\mathcal{L}(L_i)$ identified the object and class. If the method 150 determines that the number of objects with the class label k is not equal between the sets $\mathcal{L}(L_i)$ and $\mathcal{L}(G_i)$, the method 150 proceeds to Block 166 because the set $\mathcal{L}(L_i)$ is without a corresponding tag in the set $\mathcal{L}(G_i)$ (e.g., a false positive) or the set $\mathcal{L}(G_i)$ is without a corresponding tag in the set $\mathcal{L}(L_i)$ (e.g., a false negative). At Block 166, the method 150 discards the image i for use in the verified training dataset at Block 176. The "not equal" case can arise from either false positive or false negative tags in $L_i$, neither is desirable.

After evaluating the image i, the method 150 proceeds to Block 172 to determine if there are more images i to evaluate. If there are more images i to evaluate, the method 150 proceeds to Block 174 to obtain the next image i to begin the verification process again starting at Block 156. If there are not any more images, the method 150 will proceed from Block 172 to Block 176 to generate the verified training dataset. The verified training dataset includes a combination of images from the "no object" training set and the training set as determined above. Once the verified training dataset has been generated, the method 150 can proceed to Block 178 and end.

For a conventional object detection training approach, once the tagging process and the verification process are complete, a detector is trained using all the tagged training images in the verified training datasets. However, doing so puts a heavy burden on the tagging process even when we are using the semi-automated tagging process of the method 100, because it requires tagging every object of interest in every training image sequence used. As more training data will generally result in a better performing detection model, there is an intrinsic conflict between the need to have more training data and the exponential growth in the resource (time and effort) needed for tagging the objects in the training data.

This disclosure reduces the burden of tagging objects in training images by implementing a two-level detector training process that utilizes individual parts-level detectors and a unified or second level detector that can detect each object or objects from each of the individual parts-level detectors.

The individual parts-level detectors are trained first, with each containing a small number of objects of interest and configurations followed by training the second level or unified detector that comprises all the objects of interest and corresponding configurations into a single detector.

For the parts-level detector training, a group of a small number of objects (often just one or two objects) and corresponding configurations are selected. For example, two configurations for the tail cone, such as "TailCone Delivered" and "TailCone Attached" are combined to train a single parts-level detector. In this example, only one actual object of interest, a TailCone, is involved, and the two configurations represent two stages in the assembly process to be monitored. A second example is the four states "Wing LEFT Delivered", "Wing RIGHT Delivered", "Wing LEFT Loaded" and "Wing RIGHT Loaded" combined into a single parts-level detector, which has two objects of interest, Wing LEFT and Wing RIGHT, each with two configurations. The pars-level detector can also determine milestones by determining a relative position between the two objects, such as when the Wing LEFT and the Wing RIGHT are each attached to the fuselage, to determine assembly milestones.

For training data verification of the parts-level detector, a timeline for the ground-truth files is created for each of the training sequences as discussed above to eliminate any false negatives. Furthermore, a set of images that do not contain any objects detected in the parts-level detector, such as the "no object" training set, is helpful to train the parts-level detector.

For the second level of the two-level detector training, the unified detector is trained. The unified detector includes all the objects of interest and corresponding configurations from the parts-level detectors. The unified detector can then be deployed to produce data for assembly process monitoring.

The two-level detector training processes allows the parts-level detector to be trained with much less training data. This is because each parts-level detector contains only a small number of objects of interest, such as one or two objects of interest, and the corresponding configurations for the objects of interest with only a subset of training data most relevant to these objects or configurations to be tagged. One feature of this is a reduction in tagging requirements compared with having to tag all the objects of interest and corresponding configurations in all training datasets. In one example, only two to four image sequences are tagged to create the training datasets for each parts-level detector.

The two-level detector training process is also faster because the parts-level detectors contain fewer objects of interest and configurations such that it is faster to train and achieve high levels of detection performance from smaller training datasets. Also, the parts-level detectors can be managed separately from each other and the second-level unified detector. This allows for making incremental improvements to system performance possible by revising and improving the individual parts-level detectors independently and then re-training the unified detector from the revised parts-level detector.

Furthermore, an example method 200 of training the second level or unified detector is illustrated in FIG. 3. The method 200 allows for an automated process of training the unified detector. Once the parts-level detectors 208, 210, 212 are trained, they are used to process all the training data 202, 204, 206 to produce "tags" for all the objects of interest and corresponding configurations that are later verified at Block 216 before training the unified detector.

With the method 200, the classes or configurations of the unified detector are the union of all the classes/configurations in the parts-level detectors. As such, the objects and configurations or classes included in each of the parts-level detectors are combined into a single unified detector that will be able to detect each of the objects corresponding configurations.

Additionally, the training data utilized for training the parts-level detector is augmented at Block 201 before being used to train the unified detector. This is because image tagging for the specific training dataset is only performed for the objects that the parts-level detector is training for. Therefore, if an image contains a first object that is not detected by parts-level detector, that image cannot be used for training the unified detector unless the first object is also identified in the image. Otherwise, the first object in the image will create a false negative example for training as discussed above. To eliminate the false negative examples for training the unified detector, the parts-level detectors are used to generate tags for all the image sequences used to generate each of the individual parts-level detectors.

As shown in FIG. 3, Block 201 applies the trained parts-level detectors to all training data (originally collected for the parts-level detector training) and detects all objects in each of the image sequences. This allows additional training data not used before if necessary (e.g., those that we put aside for testing the parts-level detectors). This step generates tags for the training images automatically. The parts-level detectors trained with the above approach are very effective at detecting the objects in the images they are trained on and new images they are not trained on as well. This provides consistent and high-quality "tags" in terms of the class labels and the object bounding boxes (i.e., the "tags") associated with each of the images.

The method 200 verifies the training data (Block 216) against an expanded (timeline) ground-truth from Block 214 following the process described above in the method 150 to output a verified training dataset with the expanded or updated ground-truth timeline to train the second-level detector at Block 218. For the purposes of training the parts-level detectors, the ground-truth timeline includes an updated set of ground truth tags for the objects contained in the specific parts-level detector. However, for the unified detector, the ground truth timeline is expanded to an updated set of ground truth tags to include all objects the unified detector, which includes all objects and object classes in each of the parts-level detectors. As in the case for parts-level detectors, the verification process produces a set of images (with tags produced by the parts-level detectors) that are used as an updated training dataset, and a set of images that can be used as "no object" training samples.

The amount of training data created at Block 216 can be several times larger than the sum of training data used in the parts-level detector training, which contributes to higher quality (unified) detector as a result. With the training data developed by the updated training datasets at Block 216, the unified or second-level detector can be trained at Block 218 to create the detector model at Block 220 for process monitoring of assembly lines on a factory floor or any other location.

The following Clauses provide example configurations of system and methods for generating a detector with the system and methods of FIGS. 1-4, respectively.

Clause 1: A method of generating a detector, the method comprising: obtaining a first training dataset including a first image sequence having a first set of object tags identifying at least one first object class in a corresponding image of the first image sequence; obtaining a first set of ground truth tags based on a ground truth timeline identifying when the at least one first object class appeared in the first image sequence; discarding images from the first training dataset by either identifying object tags by class from the first set of object tags without a corresponding ground truth tag from the first set of ground truth tags or identifying object tags by class from the first set of ground truth tags without a corresponding object tag from the first set of object tags to generate a first verified training dataset; and training a first parts-level detector based on the first verified training dataset.

Clause 2: The method of clause 1, wherein the at least one first object class includes a first object in a plurality of different configurations.

Clause 3: The method of clauses 1-2, wherein the first image sequence includes a second set of object tags identifying at least one second object class in a corresponding image of the first image sequence.

Clause 4: The method of clauses 1-3, wherein the first training dataset is created by: receiving the first image sequence with the at least one first object class identified in at least one image of the first image sequence; tracking the at least one first object class identified in the at least one image through the first image sequence; tagging a region of interest in each image of the first image sequence where the at least one first object class was tracked; and creating the first training dataset by collecting the region of interest from each image in the first image sequence where the at least one first object class was tracked.

Clause 5: The method of clauses 1-4, including generating an additional parts-level detector by: obtaining an additional training dataset including an additional image sequence having an additional set of object tags identifying at least one additional object class in a corresponding image of the additional image sequence; obtaining an additional set of ground truth tags based on a ground truth timeline identifying when the at least one additional object class appeared in the additional image sequence; discarding images from the additional training dataset by identifying object tags by class from the additional set of object tags without a corresponding ground truth tag from the additional set of ground truth tags to generate an additional verified training dataset; and training an additional parts-level detector based on the additional verified training dataset.

Clause 6: The method of clauses 1-5, wherein the additional training dataset is created by: receiving the additional image sequence with the at least one additional object class identified in at least one image of the additional image sequence; tracking the at least one additional object class identified in the at least one image through the additional image sequence; tagging a region of interest in each image of the additional image sequence where the at least one additional object class was tracked; and creating the additional training dataset by collecting the region of interest from each image in the additional image sequence where the at least one additional object class was tracked.

Clause 7: The method of clauses 1-6, including training a unified detector utilizing the first parts-level detector on the additional verified training dataset and the additional parts-level detector on the first verified training dataset.

Clause 8: The method of clauses 1-7, wherein training the unified detector by utilizing the additional parts-level detector on the first verified training dataset includes tagging a region of interest corresponding to where the at least one additional object class appeared in each image of the first verified training dataset to create an updated additional training dataset.

Clause 9: The method of clauses 1-8, including discarding images from the updated additional training dataset by identifying object tags by class from the updated additional training dataset without a corresponding ground-truth tag from an updated set of ground truth tags.

Clause 10: The method of clauses 1-9, wherein training the unified detector by utilizing the first parts-level detector on the additional verified training dataset includes tagging a region of interest corresponding to where the at least one first object class appeared in each image of the additional verified training dataset to create an updated first training dataset.

Clause 11: The method of clauses 1-10, including discarding images from the updated first training dataset by identifying object tags by class from the updated first training dataset without a corresponding ground-truth tag from an updated set of ground truth tags.

Clause 12: A system for detecting objects, the system comprising: at least one camera configured to capture a plurality of images; and a controller configured to: obtain a first training dataset including a first image sequence having a first set of object tags identifying at least one first object class in a corresponding image of the first image sequence; obtain a first set of ground truth tags based on a ground truth timeline identifying when the at least one first object class appeared in the first image sequence; discard images from the first training dataset by either identifying object tags by class from the first set of object tags without a corresponding ground truth tag from the first set of ground truth tags or identifying object tags by class from the first set of ground truth tags without a corresponding object tag from the first set of object tags to generate a first verified training dataset; and train a first parts-level detector based on the first verified training dataset.

Clause 13: The system of clause 12, wherein the first training dataset is created by: receiving the first image sequence with the at least one first object class identified in at least one image of the first image sequence; tracking the at least one first object class identified in the at least one image through the first image sequence; tagging a region of interest in each image of the first image sequence where the at least one first object class was tracked; and creating the first training dataset by collecting the region of interest from each image in the first image sequence where the at least one first object class was tracked.

Clause 14: The system of clauses 12-13, wherein the controller is further configured to: obtain an additional training dataset including an additional image sequence having an additional set of object tags identifying at least one additional object class in a corresponding image of the additional image sequence; obtain an additional set of ground truth tags based on a ground truth timeline identifying when the at least one additional object class appeared in the additional image sequence; discard images from the additional training dataset by identifying object tags by class from the additional set of object tags without a corresponding ground truth tag from the additional set of ground truth tags to generate an additional verified training dataset; and train an additional parts-level detector based on the additional verified training dataset.

Clause 15: The system of clauses 12-14, wherein the controller is configured to train a unified detector utilizing the first parts-level detector on the additional verified training dataset and the additional parts-level detector on the first verified training dataset.

Clause 16: The system of clauses 12-15, wherein the controller is configured to train the unified detector by utilizing the additional parts-level detector on the first verified training dataset includes tagging a region of interest corresponding to where the at least one additional object class appeared in each image of the first verified training dataset to create an updated additional training dataset; and wherein the controller is configured to train the unified detector by utilizing the first parts-level detector on the additional verified training dataset includes tagging a region of interest corresponding to where the at least one first object class appeared in each image of the additional verified training dataset to create an updated first training dataset.

Clause 17: A non-transitory computer readable medium embodying programmed instructions which, when executed by a processor, are operable for performing a method comprising: obtaining a first training dataset including a first image sequence having a first set of object tags identifying at least one first object class in a corresponding image of the first image sequence; obtaining a first set of ground truth tags based on a ground truth timeline identifying when the at least one first object class appeared in the first image sequence; discarding images from the first training dataset by either identifying object tags by class from the first set of object tags without a corresponding ground truth tag from the first set of ground truth tags or identifying object tags by class from the first set of ground truth tags without a corresponding object tag from the first set of object tags to generate a first verified training dataset; and training a first parts-level detector based on the first verified training dataset.

Clause 18: The computer readable medium of clause 17, wherein the method includes generating an additional parts-level detector by: obtaining an additional training dataset including an additional image sequence having an additional set of object tags identifying at least one additional object class in a corresponding image of the additional image sequence; obtaining an additional set of ground truth tags based on a ground truth timeline identifying when the at least one additional object class appeared in the additional image sequence; discarding images from the additional training dataset by identifying object tags by class from the additional set of object tags without a corresponding ground truth tag from the additional set of ground truth tags to generate an additional verified training dataset; and training an additional parts-level detector based on the additional verified training dataset.

Clause 19: The computer readable medium of clauses 17-18, wherein the method includes training a unified detector utilizing the first parts-level detector on the additional verified training dataset and utilizing the additional parts-level detector on the first verified training dataset.

Clause 20: The computer readable medium of clauses 17-19, wherein training the unified detector by utilizing the additional parts-level detector on the first verified training dataset includes tagging a region of interest corresponding to where the at least one additional object class appeared in each image of the first verified training dataset to create an updated additional training dataset; and wherein training the unified detector by utilizing the first parts-level detector on the additional verified training dataset includes tagging a region of interest corresponding to where the at least one first object class appeared in each image of the additional verified training dataset to create an updated first training dataset.

While various embodiments have been described, the description is intended to be exemplary rather than limiting. It will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims.

What is claimed is:

1. A method of generating a detector, the method comprising:
- obtaining a first training dataset including a first image sequence having a first set of object tags identifying at least one first object class in a corresponding image of the first image sequence;
- obtaining a first set of ground truth tags based on a ground truth timeline identifying when the at least one first object class appeared in the first image sequence;
- discarding images from the first training dataset by either identifying object tags by class from the first set of object tags without a corresponding ground truth tag from the first set of ground truth tags or identifying object tags by class from the first set of ground truth tags without a corresponding object tag from the first set of object tags to generate a first verified training dataset;
- training a first parts-level detector based on the first verified training dataset;
- generating an additional verified training dataset based on an additional training dataset including an additional image sequence having an additional set of object tags identifying at least one additional object class, and an additional set of ground truth tags based on an additional ground truth timeline identifying when the at least one additional object class appeared in the additional image sequence;
- training an additional parts-level detector based on the additional verified training dataset; and
- training a unified detector by utilizing the first parts-level detector on the additional verified training dataset and utilizing the additional parts-level detector on the first verified training dataset.

2. The method of claim 1, wherein the at least one first object class includes a first object in a plurality of different configurations.

3. The method of claim 1, wherein the first image sequence includes a second set of object tags identifying at least one second object class in a corresponding image of the first image sequence.

4. The method of claim 1, wherein the first training dataset is created by:
- receiving the first image sequence with the at least one first object class identified in at least one image of the first image sequence;
- tracking the at least one first object class identified in the at least one image through the first image sequence;
- tagging a region of interest in each image of the first image sequence where the at least one first object class was tracked; and creating the first training dataset by collecting the region of interest from each image in the first image sequence where the at least one first object class was tracked.

5. The method of claim 1, wherein the additional verified training dataset is generated by discarding images from the additional training dataset by identifying object tags by class from the additional set of object tags without a corresponding ground truth tag from the additional set of ground truth tags.

6. The method of claim 5, wherein the additional training dataset is created by:

receiving the additional image sequence with the at least one additional object class identified in at least one image of the additional image sequence;

tracking the at least one additional object class identified in the at least one image through the additional image sequence;

tagging a region of interest in each image of the additional image sequence where the at least one additional object class was tracked; and creating the additional training dataset by collecting the region of interest from each image in the additional image sequence where the at least one additional object class was tracked.

7. The method of claim 1, wherein training the unified detector by utilizing the additional parts-level detector on the first verified training dataset includes tagging a region of interest corresponding to where the at least one additional object class appeared in each image of the first verified training dataset to create an updated additional training dataset.

8. The method of claim 7, including discarding images from the updated additional training dataset by identifying object tags by class from the updated additional training dataset without a corresponding ground-truth tag from an updated set of ground truth tags.

9. The method of claim 1, wherein training the unified detector by utilizing the first parts-level detector on the additional verified training dataset includes tagging a region of interest corresponding to where the at least one first object class appeared in each image of the additional verified training dataset to create an updated first training dataset.

10. The method of claim 9, further comprising discarding images from the updated first training dataset by identifying object tags by class from the updated first training dataset without a corresponding ground-truth tag from an updated set of ground truth tags.

11. A system for detecting objects, the system comprising:

at least one camera configured to capture a plurality of images; and a controller configured to:

obtain a first training dataset including a first image sequence having a first set of object tags identifying at least one first object class in a corresponding image of the first image sequence;

obtain a first set of ground truth tags based on a ground truth timeline identifying when the at least one first object class appeared in the first image sequence;

discard images from the first training dataset by either identifying object tags by class from the first set of object tags without a corresponding ground truth tag from the first set of ground truth tags or identifying object tags by class from the first set of ground truth tags without a corresponding object tag from the first set of object tags to generate a first verified training dataset;

train a first parts-level detector based on the first verified training dataset;

generate an additional verified training dataset based on an additional training dataset including an additional image sequence having an additional set of object tags identifying at least one additional object class, and an additional set of ground truth tags based on an additional ground truth timeline identifying when the at least one additional object class appeared in the additional image sequence;

train an additional parts-level detector based on the additional verified training dataset; and train a unified detector by utilizing the first parts-level detector on the additional verified training dataset and utilizing the additional parts-level detector on the first verified training dataset.

12. The system of claim 11, wherein the first training dataset is created by:

receiving the first image sequence with the at least one first object class identified in at least one image of the first image sequence;

tracking the at least one first object class identified in the at least one image through the first image sequence;

tagging a region of interest in each image of the first image sequence where the at least one first object class was tracked; and creating the first training dataset by collecting the region of interest from each image in the first image sequence where the at least one first object class was tracked.

13. The system of claim 11, wherein the additional verified training dataset is generated by discarding images from the additional training dataset by identifying object tags by class from the additional set of object tags without a corresponding ground truth tag from the additional set of ground truth tags.

14. The system of claim 13, wherein training the unified detector includes tagging a first region of interest corresponding to where the at least one additional object class appeared in each image of the first verified training dataset to create an updated additional training dataset; and tagging a second region of interest corresponding to where the at least one first object class appeared in each image of the additional verified training dataset to create an updated first training dataset.

15. A non-transitory computer readable medium embodying programmed instructions which, when executed by a processor, are operable for performing a method comprising:

obtaining a first training dataset including a first image sequence having a first set of object tags identifying at least one first object class in a corresponding image of the first image sequence;

obtaining a first set of ground truth tags based on a ground truth timeline identifying when the at least one first object class appeared in the first image sequence;

discarding images from the first training dataset by either identifying object tags by class from the first set of object tags without a corresponding ground truth tag from the first set of ground truth tags or identifying object tags by class from the first set of ground truth tags without a corresponding object tag from the first set of object tags to generate a first verified training dataset;

training a first parts-level detector based on the first verified training dataset;

generating an additional verified training dataset based on an additional training dataset including an additional image sequence having an additional set of object tags identifying at least one additional object class, and an additional set of ground truth tags based on an additional ground truth timeline identifying when the at least one additional object class appeared in the additional image sequence;

training an additional parts-level detector based on the additional verified training dataset; and training a unified detector by utilizing the first parts-level detector on the additional verified training dataset and utilizing the additional parts-level detector on the first verified training dataset.

16. The non-transitory computer readable medium of claim 15, wherein the additional verified training dataset is generated by discarding images from the additional training dataset by identifying object tags by class from the additional set of object tags without a corresponding ground truth tag from the additional set of ground truth tags.

17. The non-transitory computer readable medium of claim 15, wherein training the unified detector includes tagging a first region of interest corresponding to where the at least one additional object class appeared in each image of the first verified training dataset to create an updated additional training dataset; and tagging a second region of interest corresponding to where the at least one first object class appeared in each image of the additional verified training dataset to create an updated first training dataset.

18. The method of claim 1, wherein the first image sequence is captured during manufacturing of an aircraft, and wherein the at least one first object class corresponds to a component of the aircraft.

19. The system of claim 11, wherein the first image sequence is captured during manufacturing of an aircraft, and wherein the at least one first object class corresponds to a component of the aircraft.

20. The non-transitory computer readable medium of claim 15, wherein the first image sequence is captured during manufacturing of an aircraft, and wherein the at least one first object class corresponds to a component of the aircraft.

* * * * *